United States Patent

[11] 3,542,137

[72] Inventor Hubert Mai
P.O. Box 39, Leoti, Kansas 67861
[21] Appl. No. 710,216
[22] Filed March 4, 1968
[45] Patented Nov. 24, 1970

[54] DEVICE TO TRAP ANHYDROUS AMMONIA
1 Claim, 1 Drawing Fig.
[52] U.S. Cl. .................................................. 172/612,
111/7, 172/189, 111/85
[51] Int. Cl. ..................................................... A01b 35/00,
A01c 23/02
[50] Field of Search .......................................... 111/1, 6, 7,
83—88; 172/72, 189, 197, 9, 200, 612, 767

[56] References Cited
UNITED STATES PATENTS
1,032,998 7/1912 Erb .............................. 172/189

| | | | |
|---|---|---|---|
| 1,993,169 | 3/1935 | Hazard ........................ | 111/85 |
| 370,611 | 9/1887 | Evans .......................... | 111/85 |
| 1,635,866 | 7/1927 | Townsend et al. ............ | 111/85 |
| 1,841,236 | 1/1932 | Zaback ........................ | 111/85 |
| 3,175,622 | 3/1965 | Stam ........................... | 111/85 |
| 3,384,039 | 5/1968 | Ratliff ......................... | 111/7 |

FOREIGN PATENTS
3,439 2/1832 France ......................... 111/85

Primary Examiner—Robert E. Bagwill
Attorney—Fishburn, Gold and Litman

ABSTRACT: A furrow sealer attachment for use with an anhydrous ammonia depositing blade comprises a clamp supporting opposite ends of a length of relatively stiff wire rope in a manner whereby the rope forms a loop extending downwardly behind the blade and at an elevation whereat a portion of the rope slidably engages the ground surface and urges free soil into the furrow.

Patented Nov. 24, 1970

3,542,137

INVENTOR.
HUBERT MAI

BY
Fishburn, Gold & Litman
ATTORNEYS

DEVICE TO TRAP ANHYDROUS AMMONIA

This invention relates to agricultural implements and more particularly to fertilizer applicators of the type adapted to deposit anhydrous ammonia into the ground.

The applicators here involved include cultivator-type implements having one or more relatively thin blades which are drawn through the soil creating furrows, each blade being provided with a tube usually extending down the rear edge thereof for conducting liquid fertilizer to the lower end of the blade for escape through discharge ports into the soil. Since anhydrous ammonia, at least in part, tends to revert to a vaporous state upon being released to atmospheric pressure, it is desirable that the furrow, into which the fertilizer is deposited, is quickly covered so that the resultant gas will more likely be absorbed into soil rather than escape into the atmosphere.

Several types of devices have been suggested for use with the implement for filling the furrow immediately after fertilizer deposit, however, such devices have serious disadvantages such as poor operation in uneven ground, inability to break clods for efficient furrow filling, poor leveling of the soil, excessive drag, improper operation on turns, difficulties in adjustment, excessive complexity, high cost and short operational life.

This invention comtemplates a furrow sealer which overcomes the above difficulties through the use of a bracket mounted on or adjacent the furrow blade and securing thereto opposite ends of a length of relatively stiff wire rope whereby the rope forms a loop extending downwardly behind the rear edge of the blade and at an elevation whereat a portion of the rope slidably engages the surface of the ground behind the blade urging free soil into the furrow.

The principle objects of the present invention are: to provide fertilizer distributors particularly adapted for dispensing anhydrous ammonia and the like which include new and improved devices for closing the furrow immediately behind the blade in order to inhibit the escape and loss of gaseous fertilizer into the atmosphere; to provide such a device which is simple and inexpensive in construction and mounting and yet possesses many operational advantages over existing sealer structures; and to provide such fertilizing apparatus which is long lived and efficient in use.

Other objects and advantages of this invention will become apparent from the following description taken in connection with the accompanying drawings wherein are set forth by way of illustration and example certain embodiments of this invention.

Figure 1:
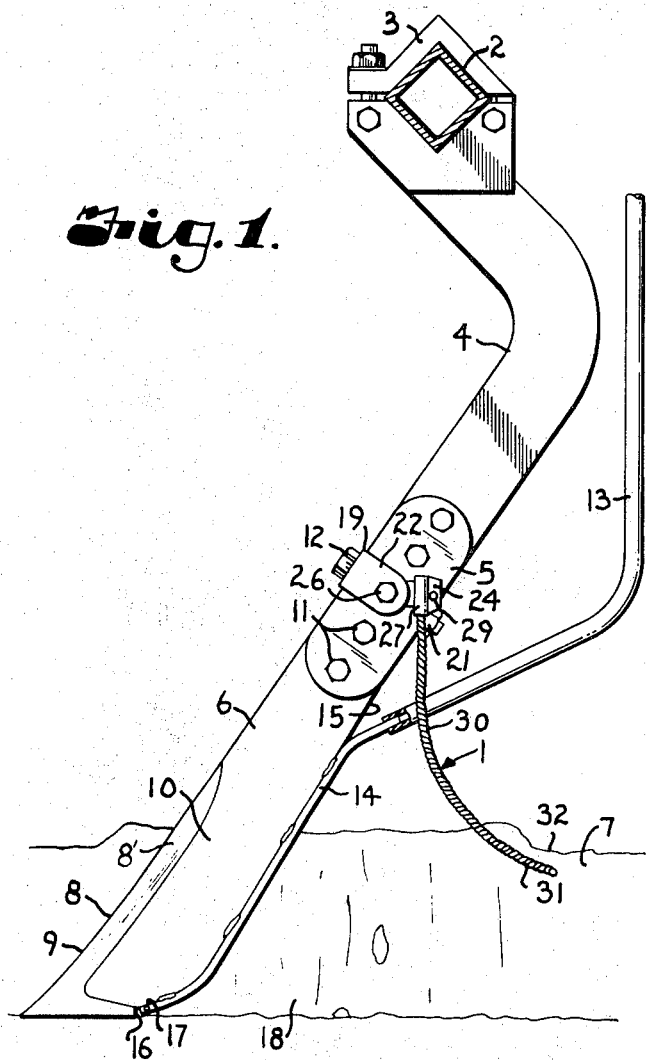
FIG. 1 is a side elevational cross-sectional view showing a fertilizer-applying blade with a furrow sealer embodying this invention secured adjacent thereto for trailing therebehind.
Figure 2:
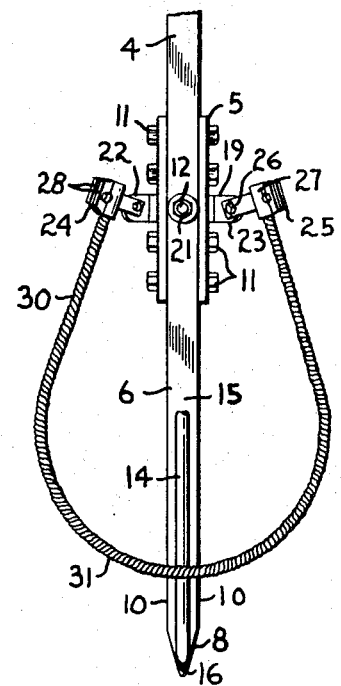
FIG. 2 is a fragmentary view showing the blade and sealer of FIG. 1 from the rear.
Figure 3:
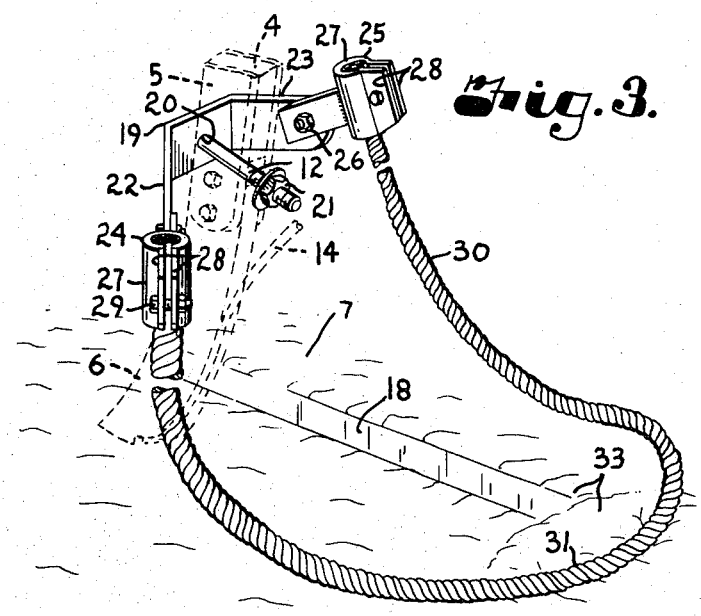
FIG. 3 is a fragmentary perspective view showing the sealer in operation closing a furrow.

Referring to the drawings in more detail:

The reference numeral 1 generally indicates a furrow sealer attachment embodying this invention. The attachment 1 is shown secured to an anhydrous ammonia applicator which includes a conventional draw bar 2 secured to a suitable frame (not shown) attached to or pulled by a conventional farm tractor or the like (not shown). The draw bar 2 supports one or more furrow-forming structures now described.

A suitable clamp 3 is secured on the draw bar 2 but easily adjusted therealong with respect to adjacent clamps for variations in crop row spacing. The clamp 3 rigidly supports a shank or beam 4, usually directed downwardly therefrom, and carrying brackets 5 at the lower end thereof. A downwardly directed knife or blade 6 projects downwardly into the ground 7 during fertilizing operation and has a pointed foot 8 which is commonly faced with an extremely hard material 8' along a forwardly directed cutting edge 9 and the side surfaces 10 to reduce abrasive wear to a minimum.

The brackets 5, in this example, are secured to the beam 4 and blade 6 by means of suitable bolts 11 extending respectively therethrough and providing a rigid joint therebetween. The beam 4 and blade 6 are slightly separated from each other between the brackets 5 producing a small passageway through which a bolt 12 may be passed for supporting the sealer attachment as described below.

A flexible conduit 13 communicates with a suitable tank (not shown) and carries the fertilizer in liquid form to a metallic tube 14 which is welded to the rear edge 15 of the blade 6 and extends downwardly to substantially the lowest part of the foot 8. The tube 14 terminates at the lower end thereof within an upwardly offset foot portion 16 at the bottom of the blade 6 so that the tube is generally protected from the forces encountered by the blade during forward movement. Suitable lateral ports 17 are provided in the tube 14 for discharging the fertilizer at the bottom of the furrow 18.

Referring more particularly to the present invention, the sealer attachment 1 includes a bracket 19 fixed generally between the beam 4 and blade 6 at the front of the brackets 5 by the bolt 12 noted above. The bolt projects through an opening 20 in the bracket 19 and is pulled tightly thereagainst by a nut 21 threadedly engaging the bolt 12 at the rear edge of the brackets 5. The bracket 19 has a pair of wings or projections 22 and 23 respectively directed laterally from each side surface 10 of the blade 6. Clamp members 24 and 25 are pivotally secured by bolts 26 to the respective projections 22 and 23 for generally vertical, pivotal adjustment thereabout. The clamp members 24 and 25 each include a socket portion 27 presenting a downwardly open cylindrical chamber which may be selectively decreased in diameter by urging rigid flanges 28 together by means of suitable bolts 29 extending transversely therethrough.

A length of relatively stiff wire rope 30 for example, five-eighths by 42 inches oil field cable has the free ends thereof secured in the respective socket portions 27 of the clamp members 24 and 25, thus forming a loop 31 extending downwardly behind the blade 6. The loop 31 projects rearwardly of the rear edge 15 and at an elevation whereat a substantial portion of the rope 30 slidably engages the surface 32 of the ground behind the blade 6, thus urging free soil into the furrow 18 during forward drawing of the blade. Due to the configuration of the loop 31, the rope 30 forms a scooplike portion urging loose soil 33 inwardly toward the furrow 18 from both sides as the attachment 1 moves forwardly with the blade 6. The pressure of the loop 31 against the ground is easily controlled by pivoting the respective clamp members 24 and 25 about the bolts 26, thus providing an adjustment to compensate for variations in soil characteristics.

It has been found that the loop 31, as described, performs well in pulverizing in the soil, thereby providing relatively fine covering material for the deposited fertilizer. The loop also serves well to level the soil while requiring little power to pull and great ease in turning.

Since the configuration of the attachment 1 is simple and there is no need to use new wire rope, construction is inexpensive. When a loop becomes excessively worn, it is easily and quickly replaced merely by withdrawal of the rope ends from the clamp members 24 and 25 and replacing the entire rope.

It is to be understood that while one form of this invention has been illustrated and described, it is not to be limited thereto except insofar as such limitations are included in the following claim.

I claim:

1. A sealer attachment for use with fertilizing apparatus adapted to apply a normally pressurized gaseous liquid into the ground and having forward draw means including a blade with a downwardly directed end projecting into the soil for producing a furrow therebehind and liquid conduit means, said sealer attachment including:

a. a bracket adapted to be fixed on said draw means above the soil, said bracket having a pair of projections respectively directed to opposite sides of said blade; and b. a clamp member pivotally secured to each of said projections and adapted for generally vertical pivotal adjustment thereabout, a furrow sealing member consisting of a length of relatively stiff wire rope having free ends respectively longitudinally adjustably secured by said clamp members whereupon said rope forms a loop therebetween adjustable in size and angular position with respect to said draw means for causing an arcuate portion of said loop to adjustably extend into sliding contact with the soil behind said draw means.